United States Patent [19]

Poldervaart

[11] Patent Number: 4,782,781
[45] Date of Patent: Nov. 8, 1988

[54] QUICK-ACTION COUPLING BETWEEN A SHIP AND A MOORING SYSTEM

[75] Inventor: Leendert Poldervaart, La Turbie, France

[73] Assignee: Single Buoy Moorings Inc., Marly, Switzerland

[21] Appl. No.: 908,818

[22] Filed: Sep. 18, 1986

[30] Foreign Application Priority Data

Oct. 15, 1985 [NL] Netherlands ................... 8502824

[51] Int. Cl.$^4$ .............................................. B63B 21/50
[52] U.S. Cl. ..................................................... 114/230
[58] Field of Search ............... 114/230, 264; 441/3–5; 277/4, 5, 66, 207 A; 285/10, 33, 131, 335

[56] References Cited

U.S. PATENT DOCUMENTS

| 3,722,556 | 3/1973 | Jeffers et al. |
|---|---|---|
| 4,153,280 | 5/1979 | Bunyan. |
| 4,490,121 | 12/1984 | Coppens et al. ............ 114/230 |
| 4,527,501 | 7/1985 | Poldervaart ............... 114/230 |

FOREIGN PATENT DOCUMENTS

| 849454 | 11/1939 | France. |
|---|---|---|
| 2367654 | 5/1978 | France. |
| 2414439 | 8/1979 | France. |
| 1170921 | 11/1969 | United Kingdom. |

Primary Examiner—Sherman D. Basinger
Assistant Examiner—Stephen P. Avila
Attorney, Agent, or Firm—Young & Thompson

[57] ABSTRACT

Quick-action coupling between a ship (1) and a mooring system (2), the coupling comprising a sleeve (6) and a core (9) fitting therein the clamping of the core (9) inside the sleeve (6) being obtained by friction generated by radial expansion of inflatable pressure pads (12). For improving uncoupling two pads (19, 20) of different diameter can be used with inbetween a space (21) into which pressure medium can be fed.

4 Claims, 2 Drawing Sheets

QUICK-ACTION COUPLING BETWEEN A SHIP AND A MOORING SYSTEM

The invention relates to a quick-action coupling between a floating apparatus, such as a ship, and a mooring system, said coupling having parts which can be inserted into each other and are provided with radially movable elements which can produce an axial connection between the parts.

Such a quick-action coupling is known, for example from U.S. Pat. No. 4,281,611 or U.S. Pat. No. 4,490,121. Quick-action couplings between a ship and a mooring system are couplings of very large dimensions which have to be capable of taking very great forces. With these known quick-action couplings people have hitherto always worked with radially movable pins which engage with recesses or grooves of the other part. These couplings require a great deal of maintenance and are relatively expensive. Although they are seldom used for disconnection or reconnection, they must always be in a state ready for immediate use, in particular where weather conditions can suddenly change or where they are being used in practical conditions which could necessitate immediate disconnection of the floating apparatus.

The object of the invention is then to produce a quick-action coupling which is simple is design and can be kept reliable with little maintenance.

This object is achieved according to the invention in that one part is a sleeve and the other part is a core fitting therein, and either the sleeve or the core is provided with a recess running in the peripheral direction in the internal face of the sleeve or in the external face of the core, said recess being provided with an axial packet of elements which expand radially when there is axial pressure, and which in the released state are free from the opposite wall, while in the tensioned state they grip thereon with friction, said packet being provided with means to press axially on the packet.

The sleeve or the core are preferably cylindrical. In the case of a cylindrical sleeve the recess and the expandable packet are in the core. In the case of a cylindrical core the expandable packet is in a recess of the sleeve. The packet comprises radially expandable elastic elements which expand radially under axial pressure and thereby produce the clamping. The axial pressure can be produced by one or more expandable pressure pads which can be inflated by means of a pressurized medium. This medium can be gaseous or liquid. A single pressure pad is sufficient, but it is also possible to place pressure pads alternately with rigid rings in the recess or to use one single pressure pad and have the packet further consist of rigid rings alternating with radially expandable elements which can be made of, for example, solid rubber.

When the packets are pressed upon axially and thereby expand radially, a friction connection is produced.

Disposed on top of and underneath the packet is preferably a sealing ring which seals off the gap between the sleeve and the core, in order to ensure that during long periods of coupling the faces of the coupling gripping each other are kept free from weather influences.

Through selection of the correct number of pads and the correct dimensions, it is possible to absorb great forces. Such a coupling requires practically no maintenance. It can be uncoupled quickly by releasing the pressure. If great moments have to be absorbed, then it is useful for the coupling to have two or more packets situated axially at a distance from each other.

It is pointed out that the principle of radial expansion in couplings is generally known, but these are couplings for the transfer of a turning moment. With quick-action couplings for pipes, radially expanding snap elements are known. The dimensions here are small. Using two packets situated axially at a distance from each other, the axial pressure can be obtained by providing a space between these packets, into which pressurized medium can be fed. The packets then do not need to have their own inflatable pressure pad. Seals are necessary at the site of the gaps existing at the side of the packets facing away from the pressure medium space.

If, however, the packets are provided with an inflatable pressure pad, and if the top packet is made with a larger diameter than the packet below it, then it is possible to promote the uncoupling by providing means which on uncoupling first reduce the pressure in the pressure pads and only then the pressure in the intermediate space.

In a connection based on friction which is maintained for a long time, the problem can arise that the parts of the coupling engaging with each other become jammed together. What is now achieved by the difference in diameter is that after uncoupling through releasing the pressure in the pressure pads the pressure still present in the intermediate space during the pressure drop taking place therein will pass a limit value in which the packets are no longer placed under sufficient axial pressure to maintain radial clamping, but there is still a pressure difference with an upward-directed component, by means of which one part of the coupling, i.e. the core, is pressed out of the sleeve.

The invention will now be explained in greater detail below with reference to the drawings.

Figure 1:
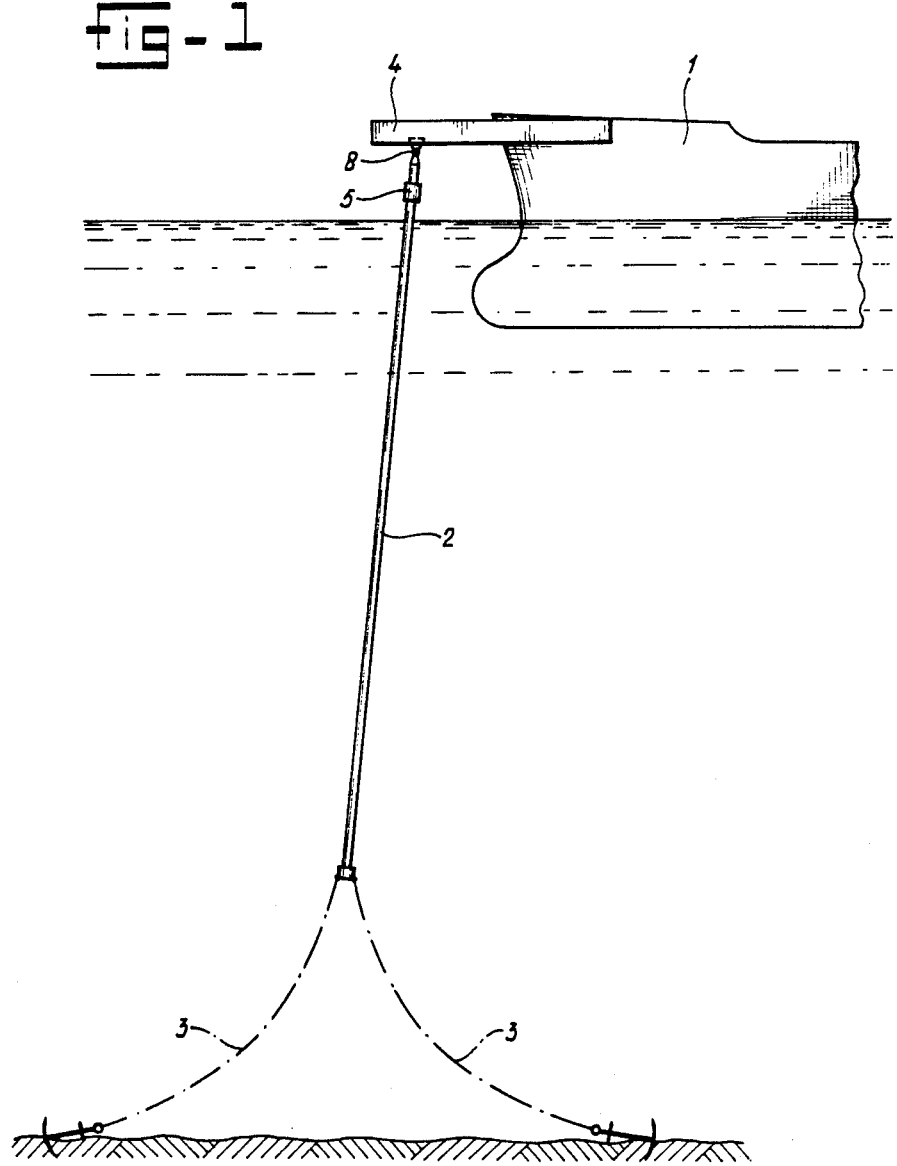
FIG. 1 shows schematically a possible application.
Figure 2:
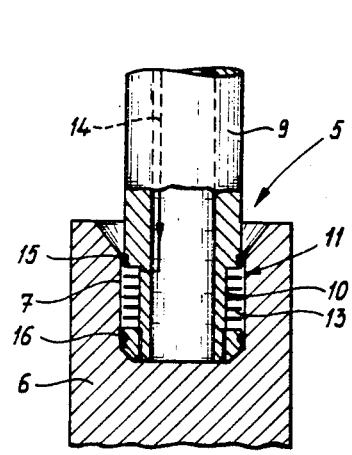
FIG. 2 shows schematically on a larger scale the principle of the coupling.

FIG. 1 shows a tanker 1 which is moored to a riser 2 which is fastened by means of anchor lines 3 to the seabed. The tanker has on its bow a projecting arm 4. The connection between the arm 4 and the riser 2 consists of the quick-action coupling 5. This comprises a sleeve 6 with a cylindrical recess 7 which is shown more clearly in FIG. 2 and in a manner not shown is coupled with the riser or forms part thereof. Hanging from the arm 4, with the interposition of a cardan coupling 8, is the core 9 of the coupling, consisting of a cylindrical pin which at its end is provided with an annular recess 10 in which is located the axial pressure packet 11.

Figure 3:
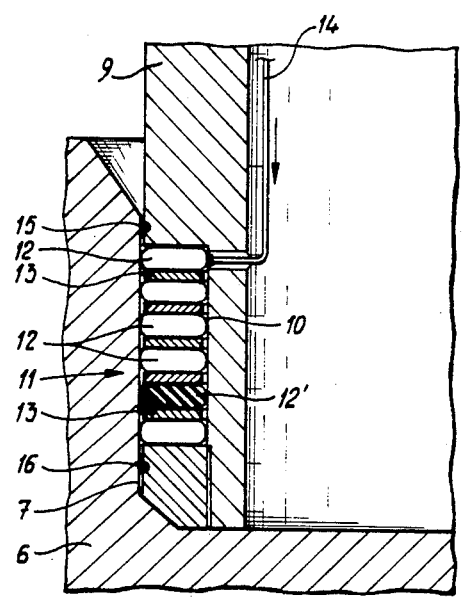
FIG. 3 shows part of FIG. 2 again on a larger scale.

This packet is shown more clearly in FIG. 3 and consists of alternating pads 12 and steel rings 13. In the released state the outer periphery thereof is smaller than the inner periphery of the sleeve 7, so that insertion and withdrawal are possible. When pressure medium is fed in via a pipe 14 to the pads 12 connected thereto, the latter will expand. Through the fact that they are retained axially and inwards, they expand radially outwards and produce a clamping on the wall 7 of the sleeve 6.

Instead of fitting pressure pads 12 and rings 13 alternately, as shown in FIG. 3, it is also possible to have just one pressure pad 12 like the pad 12 connected to the pipe 14, and to make the other pads, as indicated at 12′, of a compressible solid elastic mass, such as a rubber mass. This does not therefore have to be inflated.

Located at 15 is a seal, preferably an inflatable seal which closes off the coupling to the outside. There can be a similar seal at 16.

Figure 4:
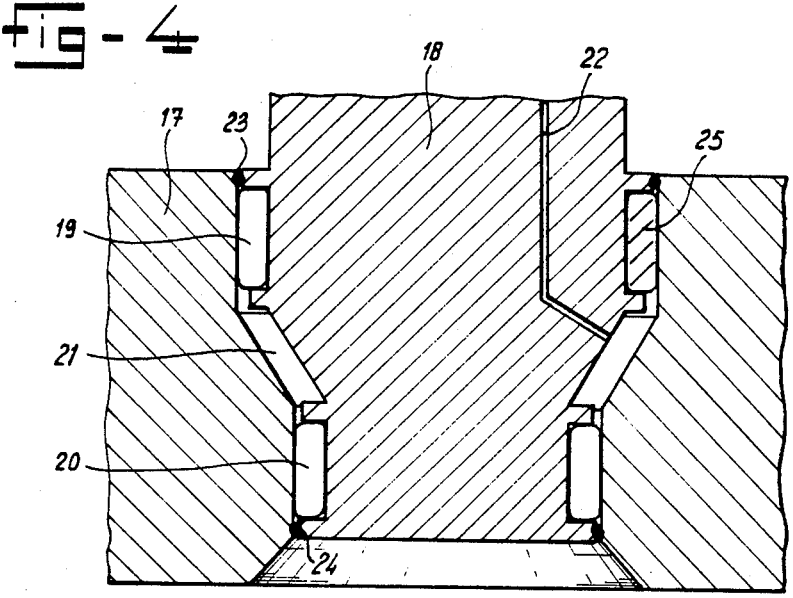
FIG. 4 shows a different embodiment.

FIG. 4 shows schematically an embodiment in which the sleeve is indicated by 17, and the core by 18, and which is provided with two expandable packets 19 and 20 which are located axially at a distance from each other, and which are of different diameters in order to promote the insertion, and which through their axial distance can absorb moments in the vertical plane.

Between the packets 19 and 20 there is a space 21 to which via the line 22 pressurized liquid can be fed, by means of which the packets 19 and 20 can be brought under axial pressure. It is then necessary for a seal to be provided at 23 and 24.

The embodiment shown in FIG. 4 shows that the packet 19 has a larger diameter than the packet 20.

If the packets 19 and 20 are now provided with at least one pressure pad 12, as shown in FIG. 3, the uncoupling can be promoted by first reducing the pressure in the packets 19 and 20 by releasing the pressure in the pad 12 and then reducing the pressure in the space 21. Once the packets 19 and 20, due to the release of the pressure, no longer engage with force with the opposite wall and possibly just stick, the detachment will be promoted by the remaining pressure in the space 21—through the diameter difference between the packets 19 and 20—generating a resulting force which works in the direction of uncoupling.

In FIG. 3 the packets are shown as placed in planes perpendicular to the centre line of the connection, but they can also be placed at an angle to this centre line, in which case the pressure pads and the plates situated between them are placed according to conical shapes, the top of which could be directed either upwards or downwards.

It is pointed out that in the drawings radially expandable elements of the packet are placed in a recess of the core to be inserted, but it is also possible to design the core with a smooth outer surface and to provided expandable elements in a recess of the sleeve.

The above-mentioned slanting position of the packets is shown schematically by line 25 in FIG. 4 on the right.

I claim:

1. A quick-action coupling for performing a connection or disconnection between a floating body such as a ship, and a mooring system, said coupling comprising two parts one of which is a sleeve and the other of which is a core slidably fitting into the sleeve, there being a circumferentially extending space between an inner wall of the sleeve and an outer wall of the core, said space being axially defined between spaced apart radially extending surfaces on one of said parts, said space containing a plurality of annular elements alternating with rigid rings disposed in said space, which annular elements can be expanded radially to press simultaneously against said inner wall of the sleeve and said outer wall of the core respectively thereby engaging said walls by friction and which thereafter can be collapsed radially to allow relative movement of said sleeve and core with respect to each other, and means for selectively expanding and collapsing said plurality of annular elements.

2. A quick-action coupling as claimed in claim 1, said means for expanding and collapsing said plurality of annular elements comprising means for generating axial pressure against said elements, the last named means comprising at least one expansible pressure pad in said space, and means for connecting said at least one pressure pad to a source of fluid under pressure.

3. A quick-action coupling as claimed in claim 1, there being a plurality of groups of said annular elements which groups are axially space apart from each other, there being a space between said groups, and means for introducing a fluid under pressure into the last-named space.

4. A quick-action coupling for performing a connection or disconnection between a floating body such as a ship, and a mooring system, said coupling comprising two parts one of which is a sleeve and the other of which is a core slidably fitting into the sleeve, there being a circumferentially extending space between an inner wall of the sleeve and an outer wall of the core, said space being axially defined between spaced apart radially extending surfaces of one of said parts, said space containing a plurality of spaced apart annular elements which can be expanded radially to press simultaneously against said inner wall of the sleeve and said outer wall of the core respectively thereby engaging said walls by friction and which thereafter can be collapsed radially to allow relative movement of said sleeve and core with respect to each other, means for selectively expanding and collapsing said plurality of annular elements, the coupling having a vertical axis such that one of said elements is disposed above another of said elements, the upper of said elements being of greater diameter and area in a plane perpendicular to said axis than the lower of said elements, and means for introducing a fluid under pressure between said spaced apart elements, whereby pressure applied to the space between said elements exerts a force tending to separate said core and said sleeve from each other.

* * * * *